(12) United States Patent
Signorino et al.

(10) Patent No.: US 9,920,920 B2
(45) Date of Patent: Mar. 20, 2018

(54) ILLUMINATION DEVICE FOR AN ELECTRICAL HOUSEHOLD APPLIANCE

(71) Applicant: emz-Hanauer GmbH & Co. KGaA, Nabburg (DE)

(72) Inventors: Manfredi Signorino, Nabburg (DE); Johann Schenkl, Bodenwoehr (DE); Martin Brabec, Nabburg (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 0 days.

(21) Appl. No.: 15/183,016

(22) Filed: Jun. 15, 2016

(65) Prior Publication Data

US 2017/0023232 A1    Jan. 26, 2017

(30) Foreign Application Priority Data

Jun. 18, 2015   (DE) .................... 10 2015 007 839

(51) Int. Cl.
| | |
|---|---|
| *F21V 33/00* | (2006.01) |
| *F25D 25/02* | (2006.01) |
| *F25D 27/00* | (2006.01) |
| *G02B 6/00* | (2006.01) |
| *F21V 7/00* | (2006.01) |
| *F21W 131/301* | (2006.01) |
| *F21W 131/305* | (2006.01) |
| *F21Y 103/10* | (2016.01) |
| *F21Y 115/10* | (2016.01) |

(52) U.S. Cl.
CPC ............ *F21V 33/0044* (2013.01); *F21V 7/00* (2013.01); *F21V 33/00* (2013.01); *F25D 25/02* (2013.01); *F25D 27/00* (2013.01); *G02B 6/00* (2013.01); *F21W 2131/301* (2013.01); *F21W 2131/305* (2013.01); *F21Y 2103/10* (2016.08); *F21Y 2115/10* (2016.08); *F25D 2325/022* (2013.01)

(58) Field of Classification Search
None
See application file for complete search history.

(56) References Cited

U.S. PATENT DOCUMENTS

2014/0320040 A1*  10/2014  Katu ................. F25D 27/00
                                                                  315/292
2014/0376213 A1   12/2014  Miedema et al.

FOREIGN PATENT DOCUMENTS

DE    20 2005 010 781 U1    11/2006
DE    10 2011 054 761 A1     5/2012
DE    WO 2013164163 A1 *    11/2013  ............ F25D 27/00

* cited by examiner

*Primary Examiner* — Kristy A Haupt
(74) *Attorney, Agent, or Firm* — Robert R. Deleault, Esq.; Mesmer & Deleault, PLLC

(57) ABSTRACT

An electrical household appliance includes an appliance body having a body interior, into which a shelf for storing objects is inserted, and an illumination device having a light source, and a light-directing structure which couples one portion of the light generated by the light source into a narrow side of the shelf, and directs another portion of the light generated by the light source into the body interior.

16 Claims, 2 Drawing Sheets

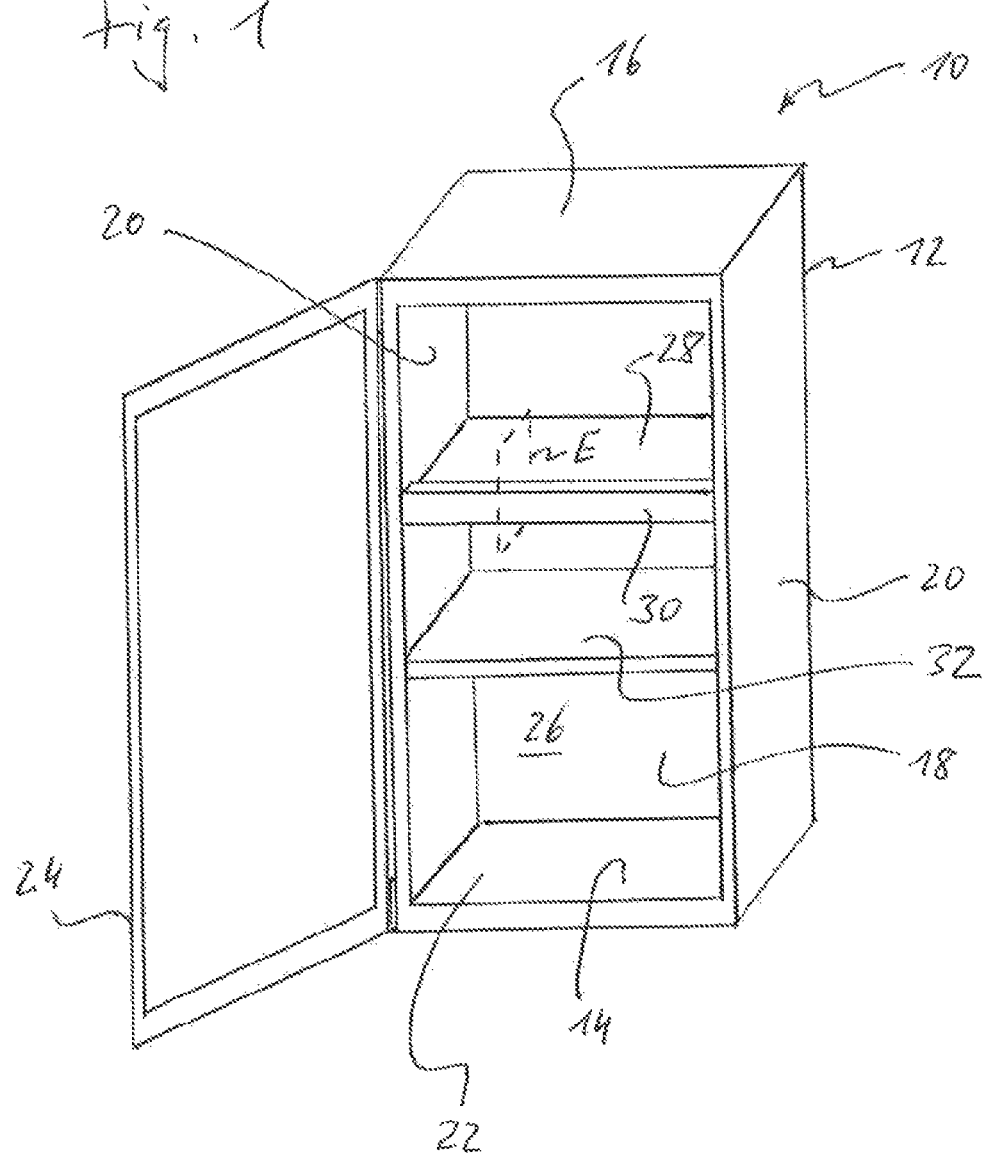

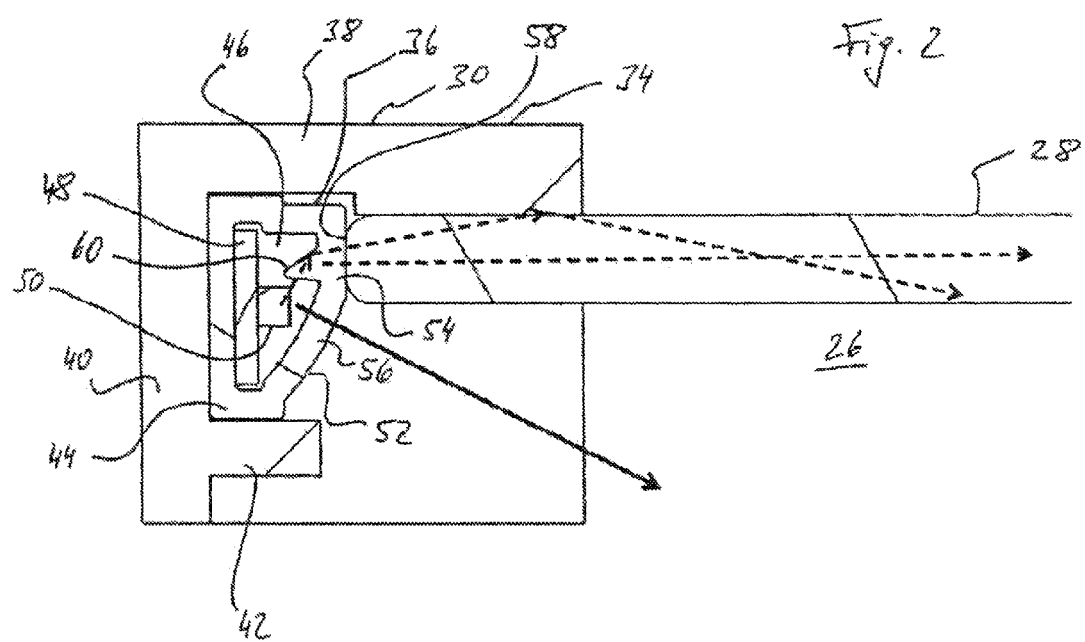

ILLUMINATION DEVICE FOR AN ELECTRICAL HOUSEHOLD APPLIANCE

BACKGROUND OF THE INVENTION

1. Field of the Invention

The present invention relates generally to an electrical household appliance, in particular a refrigerator and/or freezer, having an appliance body with a body interior and a shelf, made of a light-permeable material and inserted into the body interior, for storing refrigerated and/or frozen goods.

2. Description of the Prior Art

In refrigerators and/or freezers for household use, there is generally a need for ensuring at least partial illumination of the interior in the opened state of the appliance in order to provide the user with better visibility of the objects inside. To achieve such illumination, there is the option of irradiating a light-permeable shelf with light from a narrow side of the shelf, the light coupled into the shelf being scattered at scattering points within the shelf, thus illuminating the shelf. Another option is to irradiate light from a light source directly into the interior of the appliance body, for example toward the top side of a shelf on which objects to be kept cold are situated.

With regard to the prior art concerning interior illumination for a refrigerator and/or freezer, reference is made to US 2014/0376213 A1 by way of example.

SUMMARY OF THE INVENTION

It is an object of the present invention to provide an approach having a simple design which allows a shelf in a refrigerator and/or freezer as well as a surrounding area in the interior of the appliance to be illuminated.

To achieve this object, for an electrical household appliance of the type described at the outset, the invention additionally provides an illumination device having at least one light source, and one light-directing structure which couples one portion of the light generated by the light source into the shelf at its narrow side, and directs another portion of the light generated by the light source into the body interior. Exemplary embodiments of the invention are set forth in the subclaims.

In the approach according to the invention, it is not necessary to use different light sources on the one hand for coupling light into a shelf at its narrow side, and on the other hand for irradiating light directly into the body interior. Instead, the light provided by a light source is split, one portion of this light being coupled into the shelf at its narrow side by the light-directing structure, and another portion being directed into the body interior by the light-directing structure.

In one embodiment, it is provided that the other portion of the light generated by the light source, i.e., the portion that is not coupled into the shelf, is directed by the light-directing structure into the body interior in the direction beneath the shelf. Objects stored inside the electrical household appliance beneath the shelf may thus be well illuminated.

In one embodiment, it is provided that the electrical household appliance has an appliance door mounted on the appliance body, through which the body interior is accessible to the user. The light-directing structure is situated adjacent to a front narrow side of the shelf facing the appliance door, and couples the one portion of the light generated by the light source into this front narrow side of the shelf. A cover part for covering the front narrow side of the shelf may be provided, at least a portion of the light-directing structure resting between the front narrow side of the shelf and the cover part. By use of such a cover part, the light-directing structure may be protected from damage due to impacts when objects are placed on the shelf or removed from it. Due to the coupling of a portion of the light into the shelf, it is possible to illuminate structures introduced within the shelf itself, such as logos or other design details. In addition, good illumination of the objects stored on the shelf may be achieved by light-scattering structures within the shelf.

With regard to the design of the light-directing structure, it may be formed by a hollow profile member having at least one light source accommodated in the cavity thereof. For illuminating a large area of the body interior and the shelf, it may be advantageous to insert a support strip (for example, in the form of an elongated circuit board) into the hollow profile member, a plurality of light sources being mounted in succession on the support strip, in the longitudinal direction thereof.

In one embodiment, the light-directing structure is formed by a light-directing wall made of a light-permeable material, the light-directing wall having a first wall section, situated in front of the narrow side of the shelf, and a second wall section which adjoins the first wall section, with the light source resting behind the light-directing wall, viewed from the shelf. The second wall section is situated in such a way that it preferably protrudes downwardly in the vertical direction relative to the shelf. The light source, viewed in a section perpendicular to the longitudinal extension of the shelf narrow side, may be offset downwardly relative to the center of the thickness of the shelf. The light source may even protrude downwardly, at least partially, relative to the shelf, and, for example, may be situated partially within the area of the thickness of the shelf and may partially protrude downwardly relative to the shelf. By selecting the position of the light source in relation to the shelf, the ratio of the portion of the light that is coupled into the shelf to the portion of the light that is directed into the body interior may be appropriately set.

According to one possible embodiment, the first wall section, viewed in the section perpendicular to the longitudinal extension of the shelf narrow side, may have a nose on its side facing away from the narrow side of the shelf, which protrudes away from the shelf narrow side. Light from the light source enters the nose at its bottom side; the bridge of the nose causes a reflection, preferably a total reflection, of light from the light source in the direction toward the shelf narrow side. The first wall section may have a planar wall outer surface on its side facing the shelf narrow side. The second wall section, viewed in a section perpendicular to the longitudinal extension of the shelf narrow side, may extend with an arch-like curvature, whereby it curves away from the shelf with increasing distance from same. The second wall section may have essentially the same wall thickness throughout.

According to one embodiment, the light source may be a light-emitting diode, preferably a light-emitting diode having a beam angle range of not less than 60 degrees or 90 degrees or 120 degrees in a plane perpendicular to the longitudinal extension of the shelf narrow side.

Within the scope of one embodiment of the invention, it is possible that, of the radiant power emitted by the light source, a larger portion is directed by the light-directing structure into the body interior, and a smaller portion is coupled into the shelf narrow side.

The invention is explained in greater detail below with reference to the appended drawings.

BRIEF DESCRIPTION OF THE DRAWINGS

FIG. 1 is a perspective front view of a refrigerator with the door open, according to one exemplary embodiment FIG. 2 is a sectional view of components of an illumination device of the refrigerator in FIG. 1.

DETAILED DESCRIPTION

Reference is first made to FIG. 1. The appliance illustrated therein is denoted overall by reference numeral 10. The appliance is a refrigerator having a cabinet construction, which is used for keeping foods cold, and if needed may additionally have a freezer compartment which is situated either within the cooling chamber of the refrigerator 10 and closable with respect to the cooling chamber by a door, or, as in the case of top freezer or bottom freezer refrigerators, is situated above or below the cooling chamber. The refrigerator 10 has a cabinet body 12 with a base wall 14, a top wall 16, a rear wall 18, and two side walls 20. The cabinet body 12 forms an access opening 22 which is bordered by the base wall 14, the top wall 16, and the two side walls 20, and which is closable by a cabinet door 24 which is hinged so that is pivotable about a vertical pivot axis, and through which an interior 26 of the refrigerator 10 is accessible to the user.

The interior 26 of the refrigerator 10 may be equipped with a wide variety of built-in parts which are suitable for the storage and placement of foods. At least one of these built-in parts is a plate-shaped shelf 28 made of a light-permeable material (for example, glass or plastic), with a lighting strip 30 situated on its front narrow side, i.e., facing the user, which extends essentially over the entire width of the shelf 28 (i.e., from one of the side walls 20 to the opposite side wall 20). The lighting strip 30 has an illumination function for the shelf and also for the area of the interior 26 situated beneath the shelf 28. For this purpose, the lighting strip 30 contains a plurality of light sources, situated in succession in the strip longitudinal direction (corresponding to a direction from one of the side walls 20 to the opposite side wall 20), a portion of whose light is coupled into the front narrow side of the shelf 28 and another portion of which is directed past the shelf 28 and into the area of the interior 26 situated beneath the shelf 28. Particulars concerning the design of the lighting strip 30 are explained in greater detail below in conjunction with FIG. 2.

The lighting strip 30 may be fastened to the shelf 28. Alternatively, it may be mounted on the side walls 20 or on retaining elements (not illustrated in greater detail) which are fastened to the side walls 20. Besides its illumination function, the lighting strip 30 provides for edge protection of the shelf 28 by covering the front narrow side of the shelf 28 and thus protecting if from mechanical damage.

In the example shown, the refrigerator 10 contains an additional shelf 32, which like the shelf 28 is used for placing foods on it. Although this is not illustrated in FIG. 1, the shelf 32 may also be equipped with a further lighting strip 30. Regardless of whether the shelf 32 is equipped with its own lighting strip 30, it is preferably likewise (the same as the shelf 28) made of a light-permeable, i.e., transparent or translucent, material.

Reference is now also made to FIG. 2 for explaining the design particulars of the lighting strip 30. In this figure the lighting strip 30 is shown in a sectional illustration; a corresponding section plane is depicted in dashed lines and denoted by reference character E in FIG. 1. The lighting strip 30, which forms an illumination device within the meaning of the invention, has a cover part 34 made of a light-impermeable material (plastic or metal, for example) which has an essentially constant cross section over the entire length of the lighting strip 30 and which forms a receptacle for a lighting unit 36. The lighting unit 36 may be preassembled as a unit and inserted into the receptacle formed by the cover part 34. The cover part 34, viewed in the sectional illustration according to FIG. 2, as a rough approximation is designed as an angled strip having a horizontal upper strip leg 38 and a vertical strip leg 40 adjoining at essentially right angles to the strip leg 38, and situated in front of the shelf 28 as viewed by the user of the refrigerator 10. At a distance from the upper horizontal leg 38, a further horizontal leg 42 which is shorter than the upper horizontal leg 38 and situated at a distance beneath the shelf 28, viewed in the vertical direction, extends from the vertical leg 40. The lighting unit 36 is inserted into the space between the upper horizontal leg 38 and the lower horizontal leg 42 of the cover part 34. A secure connection between the lighting unit 36 and the cover part 34 may be established, for example, by a snap connection or an adhesive bond between the two components.

The lighting unit 36 has a hollow profile member 44 manufactured from a light-permeable plastic by extrusion, for example, with a profile cavity 46 that is closed all around. An elongated circuit board 48 which is used as a support strip is inserted into the profile cavity 46, and a plurality of light-emitting diodes 50 are mounted in succession on the circuit board in the strip longitudinal direction (corresponding to a direction perpendicular to the plane of the drawing in FIG. 2). Only one of these light-emitting diodes 50 is discernible in FIG. 2. The following explanations for directing the light generated by the one light-emitting diode 50 in FIG. 2 similarly apply for the remaining light-emitting diodes of the lighting unit 36. The board plane of the circuit board 48 is vertically oriented, so that a center axis of the main beam lobe of each of the light-emitting diodes 50 is oriented essentially horizontally for a customary installation of the light-emitting diodes 50 on the circuit board 48.

A portion of the profile wall of the hollow profile member 44 forms a light-directing wall 52, through which the light generated by the light-emitting diode 50 is directed into the shelf 28 and into the interior 26 of the refrigerator 10. The light-directing wall 50 [sic; 52] is made up of a first wall section 54 and a second wall section 56. The first wall section 54 is situated directly in front of the front narrow side of the shelf 28 denoted by reference numeral 58, and in the example shown is in contact with this narrow side 58. In other embodiments, an intermediate space may be present between the first wall section 54 and the narrow side 58 of the shelf 28. Light which exits from the first wall section 54 is coupled into the shelf 28 via the narrow side 58, as indicated by dashed-line arrows in FIG. 2. In contrast, light which exits through the second wall section 56 passes directly into the interior 26 of the refrigerator 10, as indicated by a solid-line arrow in FIG. 2. The second wall section 56 bridges the vertical intermediate space between the lower horizontal leg 42 of the cover part 34 and the bottom side of the shelf 28, and in this area extends at an angle with respect to the vertical direction. In the example case shown, the second wall section 56 is slightly curved, and has an essentially constant wall thickness in the area in which it is penetrated by light from the light-emitting diode 50.

The first wall section 54 has a planar design on its outer side facing the narrow side 58 of the shelf 28, and on its inner side facing the profile cavity 46 has a nose-like projection 60, at the bottom side of which (oriented vertically downwardly) light enters from the light-emitting diode 50 into the projection 60, and whose nose bridge forms an optical interface with the air present in the profile cavity 46, so that the light which has passed into the projection 60 may be totally reflected there via the nose underside. As an alternative to a totally reflective interface, it is conceivable to mirror coat the nose bridge with a reflective metal layer.

It is apparent in FIG. 2 that the light-emitting diode 50, viewed in the vertical direction, protrudes partially downwardly over the bottom side of the shelf 28. This is equivalent to a portion of the light-emitting diode 50 overlapping vertically with the shelf 58. By a suitable selection of the vertical position of the light-emitting diode 50 relative to the shelf 28, the ratio of the radiant power that is emitted by the light-emitting diode 50 through the second wall section 56 into the interior 26 of the refrigerator 10 to the radiant power that is coupled into the shelf 28 by the light-emitting diode 50 through the first wall section 54 via the shelf narrow side 58 may be set as desired. For example, of the radiant power that is emitted overall by the light-emitting diode 50, a larger portion is emitted into the interior 26 through the second wall section 56, and a smaller portion is coupled into the shelf 28 through the first wall section 54.

At its top side and/or at its bottom side and/or in its interior, the shelf 28 may be designed with one or more light-scattering structures which may be created, for example, by printing, sandblasting, engraving (by means of a laser, for example), or some other suitable method. These types of light-scattering structures may ensure good illumination of objects that are placed on the shelf 28.

The light-directing wall 52 together with the two wall sections 54, 56 forms a light-directing structure within the meaning of the invention.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electrical household appliance comprising:
   an appliance body having a body interior;
   a shelf, made of a light-permeable material and inserted into the body interior, for storing objects; and
   an illumination device including at least one light source and a light-directing structure configured to couple one portion of the light generated by the light source into the shelf at a narrow side of the shelf and direct another portion of the light generated by the light source into the body interior,
   wherein the light-directing structure includes a light-directing wall made of a light-permeable material, the light-directing wall having a first wall section situated in front of the narrow side of the shelf, and a second wall section that protrudes downwardly in a vertical direction relative to the shelf and adjoins the first wall section, wherein the light source is disposed behind the light-directing wall, viewed from the shelf, wherein light which exits from the first wall section is coupled into the shelf via the narrow side of the shelf, and light which exits through the second wall section passes directly into the body interior.

2. The electrical household appliance according to claim 1 wherein the light-directing structure is configured to direct the other portion of the light generated by the light source into the body interior in a direction beneath the shelf.

3. The electrical household appliance according to claim 1 wherein an appliance door is mounted on the appliance body, through which the body interior is accessible, whereby the light-directing structure is disposed adjacent to a front narrow side of the shelf facing the appliance door, and is configured to couple the one portion of the light generated by the light source into the front narrow side of the shelf.

4. The electrical household appliance according to claim 3 further comprising a cover part for covering the front narrow side of the shelf, wherein at least a portion of the light-directing structure is disposed between the front narrow side of the shelf and the cover part.

5. The electrical household appliance according to claim 1 wherein the light-directing structure includes a hollow profile member defining a cavity, wherein at least one light source is accommodated in the cavity.

6. The electrical household appliance according to claim 5 wherein the hollow profile member has a support strip inserted therein and wherein the support strip has a plurality of light sources mounted in succession thereon in a strip longitudinal direction.

7. The electrical household appliance according to claim 1 wherein the light source, viewed in a section perpendicular to a longitudinal extension of the narrow side of the shelf, is offset downwardly relative to a center of the thickness of the shelf.

8. The electrical household appliance according to claim 7 wherein the light source, viewed in the section perpendicular to the longitudinal extension of the narrow side of the shelf, protrudes downwardly, at least partially, relative to the shelf.

9. The electrical household appliance according to claim 7 wherein the light source, viewed in the section perpendicular to the longitudinal extension of the narrow side of the shelf, is situated partially within the area of the thickness of the shelf and partially protrudes downwardly relative to the shelf.

10. The electrical household appliance according to claim 7 wherein the first wall section, viewed in the section perpendicular to the longitudinal extension of the narrow side of the shelf, has a nose on its side facing away from the narrow side of the shelf, which protrudes away from the narrow side of the shelf, and light from the light source enters the nose at its bottom side, and the bridge of the nose causes a reflection of light from the light source in the direction toward the narrow side of the shelf.

11. The electrical household appliance according to claim 1 wherein the first wall section has a planar wall outer surface on its side facing the narrow side of the shelf.

12. The electrical household appliance according to claim 1 wherein the second wall section, viewed in a section perpendicular to the longitudinal extension of the narrow side of the shelf, extends with an arch-like curvature, whereby the second wall section curves away from the shelf with increasing distance from the shelf.

13. The electrical household appliance according to claim 12 wherein the second wall section has essentially the same wall thickness throughout.

14. The electrical household appliance according to claim 1 wherein the light source is a light-emitting diode having a beam angle range of not less than 60 degrees or 90 degrees or 120 degrees in a plane perpendicular to the longitudinal extension of the shelf narrow side.

15. The electrical household appliance according to claim 1 wherein a larger portion of an amount of radiant power emitted by the light source is directed by the light-directing structure into the body interior, and a smaller portion of the amount of radiant power is coupled into the narrow side of the shelf.

16. The electrical household appliance according to claim 1 wherein the appliance is one of a refrigerator and a freezer.

\* \* \* \* \*